United States Patent [19]

Arens et al.

[11] Patent Number: 4,691,306

[45] Date of Patent: Sep. 1, 1987

[54] METHOD FOR THE PROCESSING OF RECORDINGS OF SIGNALS RESULTING FROM A SEISMIC EXPLORATION OF A MEDIUM

[75] Inventors: Georges Arens, Croissy S/Seine; Philippe Staron, Mennecy, both of France

[73] Assignee: Societe Nationale Elf Aquitaine (Production), Courbevoi, France

[21] Appl. No.: 754,436

[22] Filed: Jul. 12, 1985

[30] Foreign Application Priority Data

Jul. 18, 1984 [FR] France ............................ 84 11341

[51] Int. Cl.$^4$ ........................... G01V 1/00; G06F 7/48
[52] U.S. Cl. ....................................... 367/40; 367/51; 364/421
[58] Field of Search ........................... 367/40, 51, 63; 364/421

[56] References Cited

U.S. PATENT DOCUMENTS

| | | | |
|---|---|---|---|
| 3,207,256 | 9/1965 | Blizard | 181/5 |
| 3,330,374 | 7/1967 | Broussard et al. | 181/5 |
| 3,568,143 | 3/1971 | Naquin | 364/421 X |
| 4,037,190 | 7/1977 | Martin | 367/40 X |
| 4,064,481 | 12/1977 | Silverman | 364/421 X |
| 4,316,266 | 2/1982 | Barbier et al. | 367/23 X |
| 4,346,460 | 8/1982 | Schuster | 367/27 |
| 4,460,986 | 7/1984 | Millouet et al. | 367/40 X |
| 4,592,030 | 5/1986 | Arditty et al. | 367/27 |

FOREIGN PATENT DOCUMENTS 2514152  10/1981  France .

Primary Examiner—Thomas H. Tarcza
Assistant Examiner—Tod R. Swann
Attorney, Agent, or Firm—Holman & Stern

[57] ABSTRACT

Method for the processing of recordings of signals resulting from a seismic exploration of a medium.

It consists, after grouping recordings in pairs and crosscorrelation of the recordings of each pair, in grouping the elementary crosscorrelation functions thus obtained in at least one family in which the measuring spaces are included in a same predetermined reference space, in transforming the time variables of the said functions in order to bring the measuring space dimension to that of the reference, then in adding the transformed functions.

Application in particular to acoustic logging seismic reflection or refraction.

15 Claims, 5 Drawing Figures

METHOD FOR THE PROCESSING OF RECORDINGS OF SIGNALS RESULTING FROM A SEISMIC EXPLORATION OF A MEDIUM

The present invention relates to a method for the processing of recordings of signals resulting from a seismic exploration of a medium and it can be implemented just as well in seismic reflection or refraction as during an exploration by acoustic logging.

For reasons of clarification, an example of application to acoustic loggins will be given below.

The classic technic for acoustic logging consists of creating, by means of a tranmitter, acoustic energy which passes through all or part of the formations of the medium to be explored before reaching the receivers which deliver electrical signals which are recorded and then processed in order on the one hand to be able to separate, in particular, the compression waves P from the shearing waves or S waves, and on the other hand to calculate the various average velocities of the said waves in the formations passed through.

In the well known art some of acoustic logging are carried out during the boring of a borehole, and which we define as being instantaneous, while others are defined as being deferred. The latter are carried out using a special tool which is lowered down into the borehole the said tool including one or more transmitters and/or one or more receivers. In fact the tool can include either the transmitter or transmitters only, the receivers then being placed on the surface, or the opposite, i.e. receivers only with the transmitter or transmitters being on the surface, or even both the transmitters and the receivers.

The processing of the signals received and recorded on the receivers of such tools did not enable, even though they were complicated and very costly, the removal of ambiguity in the velocities of waves propagating in the formations surrounding the borehole This arises because of the fact that the spectrum of the signals received by the receivers is relatively narrow, this being related to the number of peaks in each of the recorded signals. In addition, the signal/noise ratio is generally not satisfactory. In order to overcome these difficulties, classic acoustic logging restricts measurement to only the compression waves or P waves that are first to arrive at the receivers, rejecting, in doing this, in particular the S waves, the study of which is however necessary in order to have a better understanding of the physical characteristics of the formations passed through.

In the French application No. 7 821 226 or U.S. Pat. No. 4,460,986 there are descriptions of a tool and a method of acoustic logging which contribute original solutions to the problems posed by the standard tools and processes described briefly above.

The method described in this U.S. patent consists in transmitting and receiving acoustic waves using means of transmission and reception that between them define at least two acoustic paths of different lengths, in recording during each transmission the totality of the signals received, then in logging, at the moment of transmission and for each recording, the respective positions of the transmitter-receiver pair.

The processing of the recordings consists in grouping the recordings in pairs such that said pairs have path segment facing the same geological layer of interest the acoustic paths corresponding to the recordings of such pair having a common path segment and part not in common facing said geological layer of interest, determining for each type of wave of interest the difference between the arrival times of said wave of interest on the recordings of each pair. Another stage of the processing consists in crosscorrelating the recorded signals of each pair of recordings in order to obtain an elementary crosscorrelation function, then in summing all the crosscorrelation functions for each gelological layer.

This processing of recorded signals enables the elimination of propagation noises and therefore a very significant improvement in the signal/noise ratio. In addition, the maxima corresponding to the different waves received are favored and this enables a better study of the characteristics of said waves.

However, the plotting of the waves to be studied in each elementary crosscorrelation function can present certain difficulties. In fact each crosscorrelation function includes a certain number of primary and secondary lobes or peaks and it is sometimes difficult to determine surely which of the peaks corresponds with the maximum energy of a specified wave. The result of this is that the sum of the elementary crosscorrelation functions relating to several adjacent layers of the formations also includes many peaks; it cannot therefore be used for removing the ambiguity mentioned above.

The applicant has therefore sought for and found a new processing of the recordings of the signals which applies not only to the processing of the signals obtained by acoustic logging but also to those obtained by other seismic exploration processes of reflection or refraction type, the new processing enabling an improvement in the power of resolution by increasing the accuracy with which the maxima or useful lobes can be plotted.

It is an object of the present invention to provide a method for the processing of the recordings of signals resulting from a transmission and a reception of acoustic waves propagating into a medium, consisting in grouping the recordings in pairs such that in each pair the two recordings correspond to two acoustic paths including at least one non-common segment defining a measuring space and at least one common segment; in crosscorrelating the two recordings of each pair in order to obtain an elementary crosscorrelation function defining the time taken by the waves of the said pair to travel through the measuring space; in grouping the elementary crosscorrelation functions in at least one family in which the measuring spaces are included in a same predetermined reference space; in transforming the time variable of the elementary crosscorrelation functions in order to bring the size of their measuring space to the size of the reference space; in adding all the transformed crosscorrelation functions in order to form a sum crosscorrelation function of which the abscissas of the useful lobes represent the propagation time of the waves over the reference space.

One advantage of the present invention is in the fact that only the useful lobes representing the propagation time of the waves over the reference space are retained.

When, according to another object of the invention, the transformation that brings the measuring space of each elementary crosscorrelation function to the size of the reference space is an expansion of the said crosscorrelation functions in order to bring them to that corresponding to the largest geological layer of interest, the secondary lobes are then attenuated, or more precisely they are pushed rather far away laterally from the significant primary lobes of the energy of the received waves. This is valid in the time domain. In the spectral domain, one may notice that the expansion enables a widening of the frequency spectrum and, consequently, of further smoothing it giving a practically flat spectrum.

Other advantages and characteristics will become apparent on reading the description, given below by way of an example, with reference to the drawings, in which.

Figure 1:
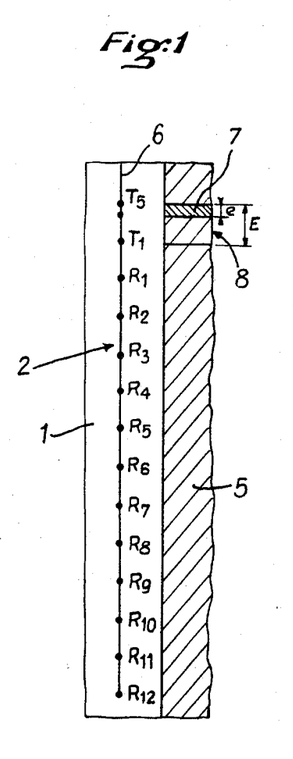
FIG. 1 shows, in representative block form, representation of an well logging tool placed in a borehole.

In FIG. 1 is a very diagrammatic representation of a borehole 1 partially shown in which is placed a logging tool 2 including transducers indicated in the figure by five magnetostriction transmitters $T_1$ to $T_5$ spaced 0.25 m from each other in alignment with twelve receivers $R_1$ to $R_{12}$ of piezoelectric ceramic type, spaced 1 m from each other. With such a configuration of the tool 2, for each position or level of the said tool 2 in the borehole 1, 49 acoustic paths of different lengths in the formations 5 surrounding the borehole 1 are obtained.

The tool 2 is operated from the surface of the borehole by means of traction of which only a section of the cable 6 is represented in FIG. 1. The cable 6 also serves as a housing for the electrical conductors necessary for the operation of the said tool 2.

For the sake of clarity, the acoustic paths of the waves transmitted by one of the transmitters $T_1$ to $T_5$ and received by the receivers $R_1$ to $R_{12}$ have not been shown in the Figure. It would be helpful to refer to U.S. Pat. No. 4,460,986 in which they are shown.

The tool has, for example, an advancing step equal to the spacing between transmitters, the said spacing corresponding to the thickness e of a geological layer of interest 7 which also forms what is defined below as being a measuring space. For the tool 2 considered, the advancing step is therefore 0.25 m.

The displacement of the tool 2 in the borehole 1 is carried out in such a way that the lower transmitter $T_1$ is raised up to occupy the position previously held by the adjacent transmitter $T_2$, the transmitter $T_2$ then occupying the place previously held by transmitter $T_3$, and so on.

Because of this, for each transmission of an acoustic wave, and for each level of the tool, there are acoustics paths which have one common end and a non common part. When the acoustic path of a wave transmitted by transmitter $T_5$ and received by receiver $R_1$, and the one wave transmitted by tranmitter $T_4$ and also received by receiver $R_1$ are plotted there would be two acoustic paths present having a common end $R_1$ and a non common part corresponding to the spacing between the transmitters $T_4$ and $T_5$, the said non common part corresponding to the geological layer of interest 7 or the measuring space.

The waves received by receivers $R_1$ to $R_{12}$ are converted into electrical signals which are recorded on means of recording that are not shown but which are well known to seismologists. The means of recording also record for each transmission the level of the tool 2 and the respective positions of the associated transmitter-receiver pair for that transmission. Thus, at each recording, that recording has to be associated with the transmitter-receiver pair that gave rise to it.

A first stage according to the invention consists in grouping the recordings in pairs, each pair including, for the type of wave for which the propagation speed has to be determined, two acoustic paths having one common end and only one no common part.

A last stage of the processing consists in choosing a reference space in which the propagation speed has to be determined. One way of determining the reference space is, among others, to take a geological layer 8 of thickness equal to the spacing between the extreme transmitters of the tool. In the example represented in the drawing, this spacing E is equal to 1 m for a tool with five transmitters regularly spaced by 0.25 m.

The measuring spaces as defined above and because of the application to loggings are unidirectional.

The two recordings of each pair are crosscorrelated with each other, the result of the operation being an crosscorrelation function called elementary which serves to define the time taken by the considered wave to pass through the non common part since the very purpose of the correlation operation is the elimination of the common part of the two acoustic paths corresponding to the two recordings.

Figure 2:
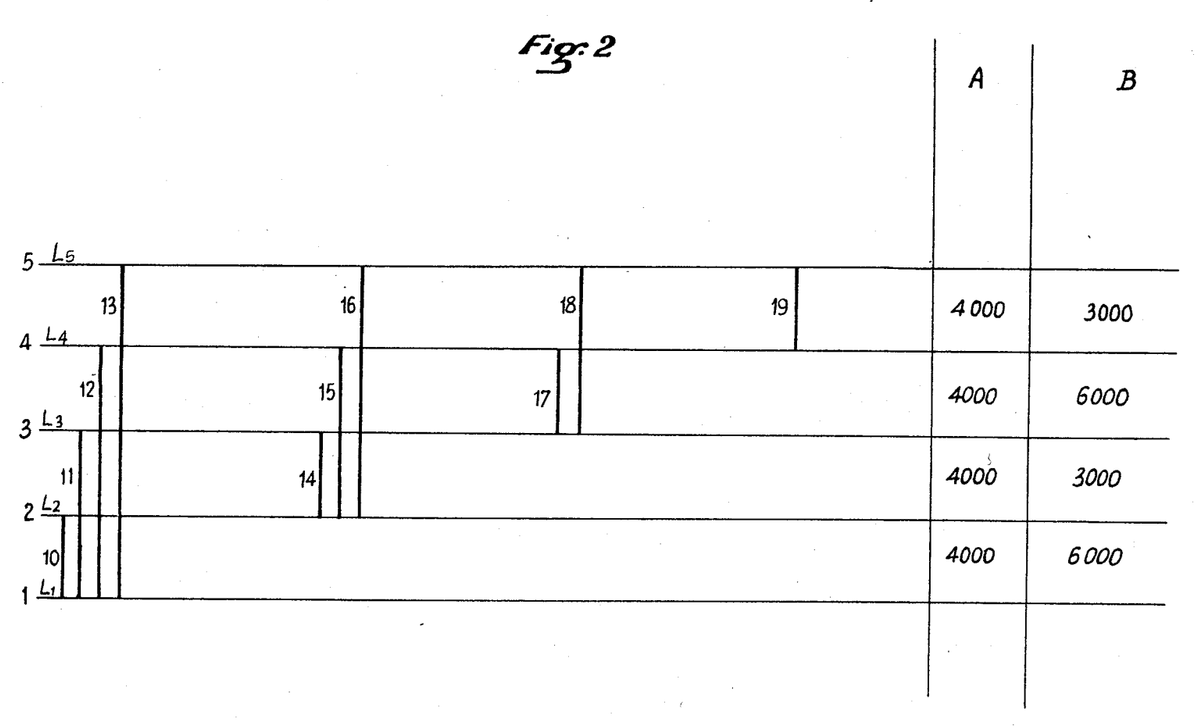
FIG. 2 shows a representation of a given reference space of the various measuring spaces over which will be determined the elementary crosscorrelation functions which will then be deformed in order to bring their measuring spaces to the reference space.

The elementary crosscorrelation functions are then grouped in order to form a set of families for which the measuring spaces corresponding to the elementary crosscorrelation functions are included in the predetermined reference space E. FIG. 2 represents, on the left, all the measuring spaces over which the elementary crosscorrelation functions are carried out in the reference space E. The spacings between the horizontal lines $L_1$ to $L_5$ represent the measuring spaces each corresponding to a geological layer of interest. For example, line $L_1$ corresponds to the position of transmitter $T_1$ of the tool 2, lines $L_2$ to $L_5$ similarly corresponding to the positions of transmitters $T_2$ to $T_5$. In this figure, the vertical line 10 represents the measuring space corresponding to the elementary crosscorrelation function carried out over the two recordings of the pair associated with transmitters $T_1$ and $T_2$ and with any same receiver, while line 11 represents the measuring space corresponding to the elementary crosscorrelation function obtained from the pair associated with transmitters $T_3$ and $T_1$ and with any same receiver.

The elementary crosscorrelation functions corresponding to measuring spaces 10 to 13 represent a first family which is characterized by measuring spaces having a common end.

The elementary crosscorrelation functions corresponding to measuring spaces 14 to 16, 17 and 18 then, finally, 19, represent the other families characterized by similar criteria.

Obviously, the distribution of elementary crosscorrelation functions into families can be carried out in a different way, for example by grouping the elementary crosscorrelation functions corresponding to different measuring spaces which each have the same dimension, for example this would include forming a family including the elementary crosscorrelation functions corresponding to single-unit measuring spaces 10, 14, 17 and 19; or double-unit measuring spaces 11, 15 and 18; or again, triple-unit measuring spaces 12 and 16.

Figure 3:
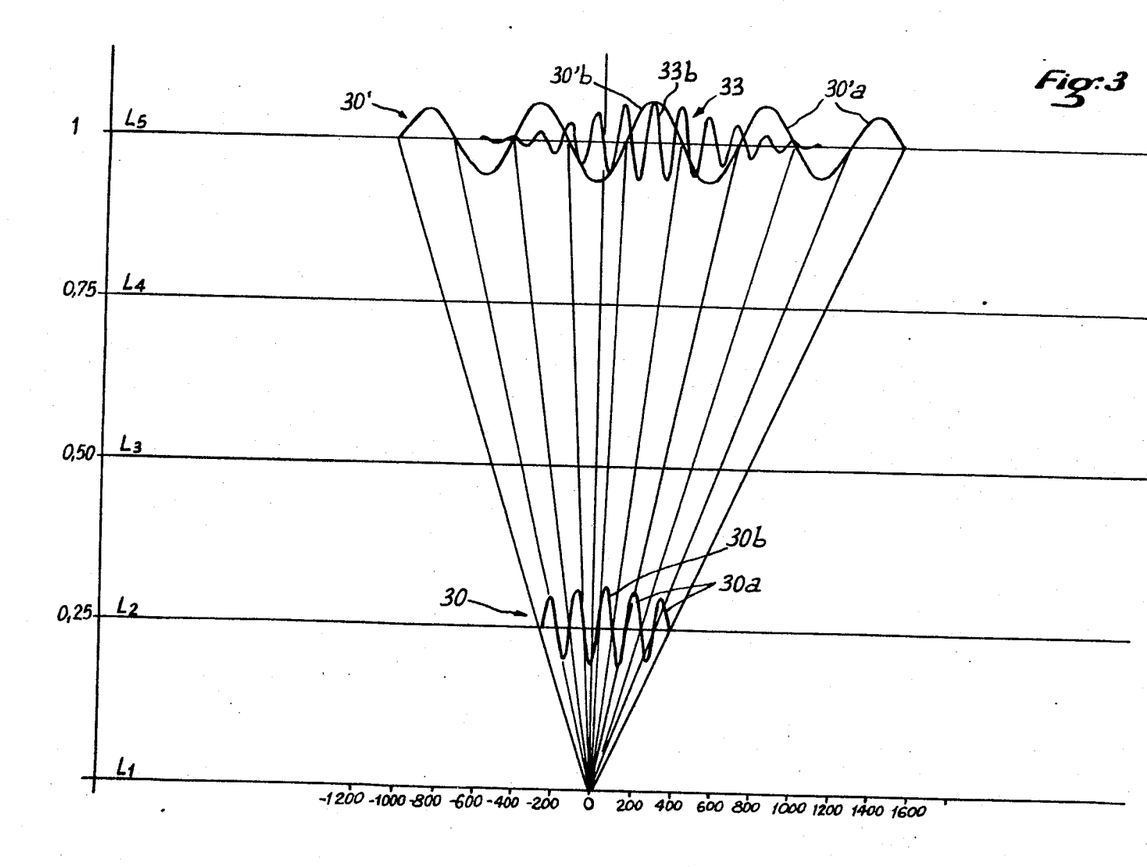
FIG. 3 shows a representation of two elementary crosscorrelation functions of which one is deformed by expansion in the time scale.

FIG. 3 is a representation of the amplitude as a function of time given in microseconds, of two crosscorrelation functions 30 and 33 corresponding with measuring spaces 10 and 13 respectively, and of the transformation 30' of the crosscorrelation function 30.

According to a characteristic of the processing according to the invention, the time variable of the elementary crosscorrelation functions is transformed in order to bring the size of the measuring space of these functions to that of the reference space. In this case the transformation is an expansion in the time scale and more particularly a similarity. Comparing the crosscorrelation function 30 with its transform 30', it is noted that the transform 30' is similar to the crosscorrelation function 30 having a similarity about center O and a ratio of 4, the center O also being the theoretical time origin of the crosscorrelation functions. In the example represented in FIG. 3, the oblique lines indicate the correspondence of the various points between the crosscorrelation function 30 and its transform 30'. One may also note that the time taken to pass through the measuring space by the acoustic wave considered and recorded on the recordings and having given rise to the crosscorrelation function 30 is brought to the size of the reference space which is no other than the transition time of the same type of wave recorded on the recordings having given rise to the crosscorrelation function 33.

One purpose of this important stage of the processing is to push the secondary lobes 30a of the elementary crosscorrelation function 30 sideways in order to make the primary lobe 30b correspond with that of 33b of the elementary crosscorrelation function 33. This is particularly essential when, as is the case regarding the elementary crosscorrelation functions 30 and 33, the secondary lobes 30a and 33a are of approximately the same amplitude as the respective primary lobes 30b and 33b. The expansion in the time scale enables the transformed primary lobe 30'b to be brought into correspondence with the primary lobe 33b and the transformed secondary lobes 30'a to be pushed away sideways. The attenuation of the secondary lobes is improved if the selected measuring spaces have corresponding crosscorrelation functions showing time differences between central peaks and secondary lobes close to each other. After transformation, the time differences do not correspond in the transformed function to another one. During the additional step of the transformed functions, the central peaks are added together while the secondary lobes are no longer in correspondence with each other and thus cannot then be added.

In order not to overload FIG. 3, it has not been represented the other elementary crosscorrelation functions corresponding to the measuring spaces 11 and 12 and their transforms.

Figure 4:
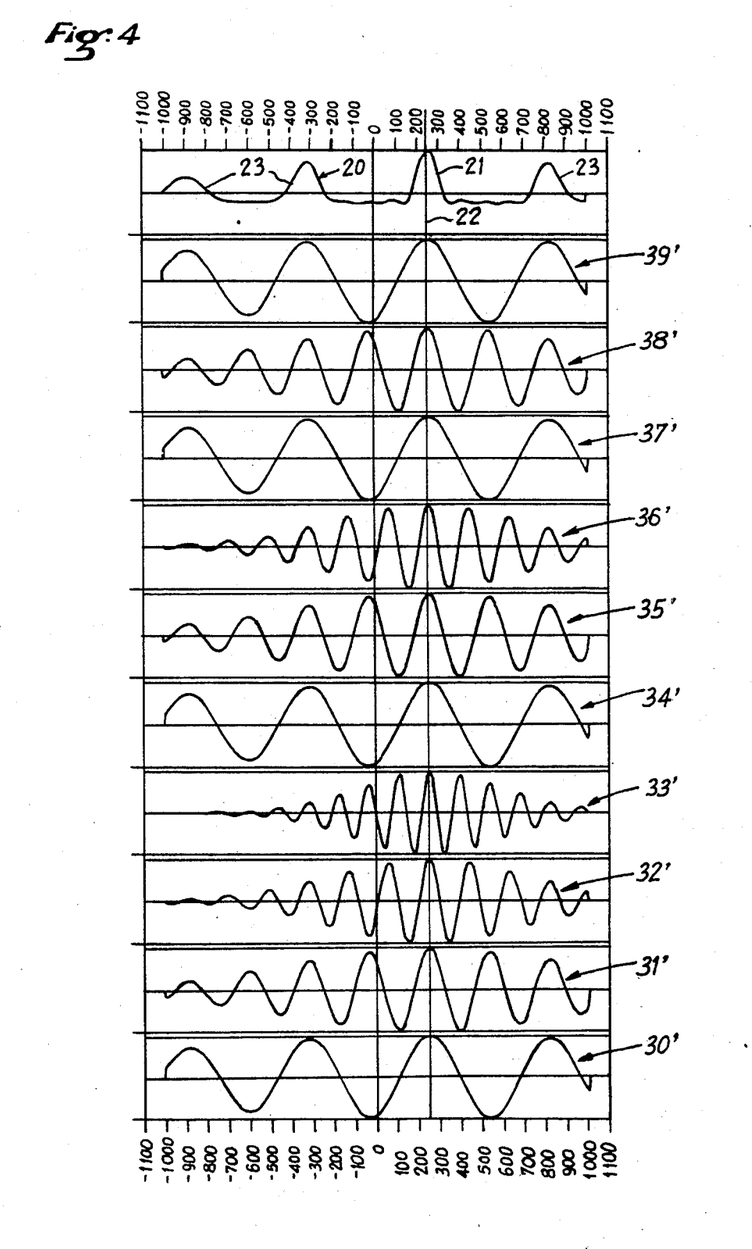
FIG. 4 shows the deformed crosscorrelation functions relating to a consistent reference space in which the velocity of propagation of a considered wave is assumed to be constant.

In FIG. 4, there are represented from bottom to top the transforms 30' to 39' of the elementary crosscorrelation functions corresponding to measuring spaces 10 to 19, the only one which has not been subjected to any transformation being of course crosscorrelation function 33 since its measuring space is the reference space. The transforms 30' to 39' find themselves shifted with respect to the zero of the time axis marked in microseconds, the vertical axis representing the amplitudes. In addition, the transforms 30' to 39' correspond with a geological layer in which the velocity of the considered acoustic wave practically does not vary and is, for example, equal to 4000 m/s. We then add all the transforms 30' and 39', the result of which is a sum crosscorrelation function 20 which has one useful lobe 21 of which the abscissa is 250 microseconds for the example represented. When a vertical line 22 is plotted parallel to the vertical axis and passing through the peak of the useful lobe 21, the said vertical line 22 also passes through the peak of the primary lobes of the transforms 30' to 39', which could have been predicted because of a constant velocity of the acoustic wave through the whole of the thickness of the reference layer. The residual lobes 23 of the sum crosscorrelation are pushed away sideways and attenuated in amplitude.

When the velocity of propagation of the wave considered varies in the reference layer or the reference space, as indicated in column B of FIG. 2, Column A being given for a constant velocity of 4000 m/s, the transforms 30" to 39" (FIG. 5) of the crosscorrelation functions corresponding the measuring spaces 10 to 19 are different from the transforms 30' to 39' in FIG. 4.

Figure 5:
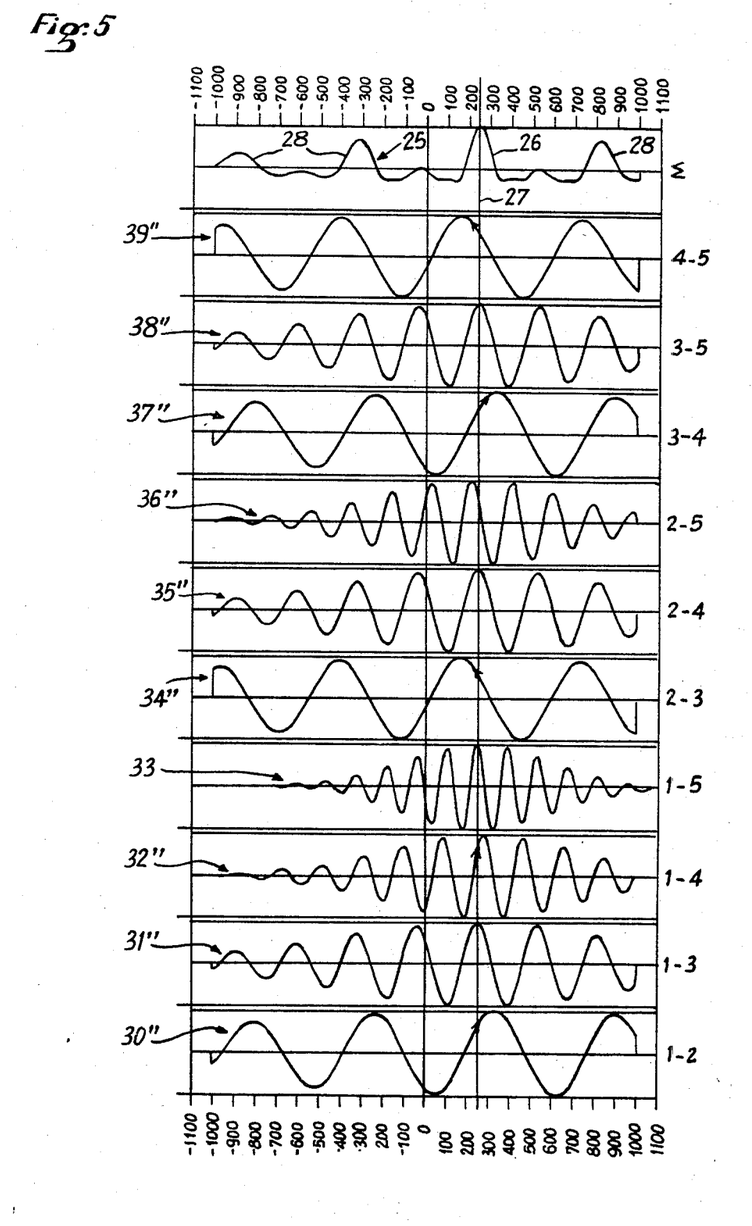
FIG. 5 shows crosscorrelation functions similar to those of FIG. 4 but for a reference space in which the velocity of propagation of the same wave varies.

The result of adding the transforms 30" to 39" is a sum crosscorrelation function 25 which has one useful lobe 26 of which the abscissa, 250 microseconds, represents the mean propagation time of the considered wave in the reference layer. The time shift of 250 microseconds of peak of the useful lobe 26 of the sum crosscorrelation function 25 must be compared with the time shift, also of 250 microseconds, of the peak of the useful lobe 21 of the sum crosscorrelation function 20 of FIG. 4. This signifies that in both cases the propagation time of the wave in the reference layer is identical. In other words, the slowness 1/V which is the inverse of the velocity is equal in both cases. This can be verified with the velocities given in columns A and B of FIG. 2 and for equal thicknesses of layers of interest. In fact, if we take two geological layers of the same thickness in which the mean velocity of propagation of a wave is 4000 m/s, the slowness in both layers would be $1/V=(1/n)\Sigma(1/Vi)$ or $\frac{1}{2}(1/4000+1/4000)=1/4000$ seconds/meter, n being the number of measuring spaces of the same dimension and Vi the velocity of the wave in each measuring space. If now the velocity in one of the said layers was 6000 m/s and 3000 m/s in the other layer, the overall slowness in both layers would be $\frac{1}{2}(1/3000+1/6000)=1/4000$ seconds meter.

A vertical line drawn parallel to the vertical axis and passing through the peak of the useful lobe 26 shows that the primary lobes of the transforms 10" to 19" are no longer aligned, as was the case in FIG. 4. This is completely normal as the propagation velocity of the considered wave varies from one geological layer to another in the reference layer, the consequence being that the shifts of the elementary crosscorrelation functions are different from one geological layer to another. In this hypothesis, and this is another advantage of the present invention, we can determine which are really the primary lobes of the transforms 30" to 39" and, consequently, the real maxima of the elementary crosscorrelation functions. In order to do this, on moving along the elementary crosscorrelation functions in the rising direction indicated by an arrow in FIG. 5, we select on each elementary crosscorrelation function the lobe closest to the vertical line 27, the abscissa of the said selected lobe representing the slowness of the wave over the measuring space of the elementary crosscorrelation function considered. For example, for the transform 39", the primary lobe is lobe 39"b of which the abscissa is representative of the slowness over the corresponding measuring space, whereas for transform 37", the primary lobe is lobe 37"b of which the abscissa is greater than that of the primary lobe 39"b, verifying by that the difference between the propagation velocities of the considered wave in the respective layers of interest, the velocity for transform 39" being 3000 m/s while the velocity for transform 37" is 6000 m/s.

The primary lobes of the transforms that are aligned with the useful lobe 26 enable the deduction that the corresponding slowness is equal to the mean slowness of the reference layer. This also applies to transforms 38", 35", 33 and 31".

The residual lobes 28 of the sum crosscorrelation function 25 are pushed away sideways and attenuated in amplitude.

All of the above has been mentioned with reference to a considered type of wave, for example the compression wave or P wave. For other types of wave such as shearing waves or S waves, Stoneley waves, it could be similarly proceed by selecting on each pair of recordings the parts of the recordings corresponding to the S waves, the Stoneley waves, etc., the said parts of recordings being then crosscorrelated to give rise to an elementary crosscorrelation function. The other processing operations according to the invention would be carried out in the way indicated above.

It should be noted that in the frequency spectrum domain, the processing according to the invention results in a very large improvement on what is normally obtained with the usual methods. In fact, the sideways pushing away of the residual lobes of the sum crosscorrelation functions corresponds to a widening of the pass band of the frequency spectrum with respect to the corresponding spectra of the elementary crosscorrelation functions.

Finally, as has been mentioned in the preamble, the processing according to the present invention is not limited to the methods of seismic exploration by acoustic loggings, but can be used for other seismic exploration methods such as those based on the reflection or refraction of waves produced in the medium to be explored. This is possible due to the fact that the proposed processing concerns only the non common part of the two acoustic paths no matter what the shapes of the said paths may be.

The invention is of course in on way limited to the embodiments of the example described and represented and it is subject to numerous variants accessible to a specialist in the field depending on the envisaged applications without because of this being taken out of the scope of the invention.

It is particularly so as regards the relationship between the spacing between transmitters, the advancing step of the tool 2 and the dimensions of the measurement and reference spacings. In fact, the important criteria, according to the invention, are the smallest distance between two transducer of the same type (transmitters or receivers) or the smallest of the differences between the distances of two transducers of opposite type (transmitters and receivers) and a reference space having a dimension greater than this spacing, the advancing step of the tool being independent and able to be anything whatsoever. A tool could be designed including receivers spaced by 0.25 m and transmitters spaced by 1 m and a measuring space could be defined as having a dimension equal to 0.25 m and a reference space of anything whatsoever on condition that its dimension is greater than 0.25 m, for example 1 m. For greater measuring convenience, a reference space is chosen having a dimension that is a multiple of that of the measuring space.

We claim:

1. Method for the processing of recordings of signals resulting from a transmission and a reception of acoustic waves propagating into a medium, comprising the steps of:
    grouping the recordings in pairs such that in each pair the two recordings correspond to two acoustic paths including at least one non-common part defining a measuring space and at least one common part;
    cross correlating the two recordings of each pair in order to obtain an elementary cross correlation function defining the time taken by the waves of the said pair to travel through the measuring space;
    grouping the elementary cross correlation functions in at least one family in which the measuring spaces are included in a same predetermined reference space;
    transforming the time variable of the elementary cross correlation functions in order to bring the dimension of their measuring space to the dimension of the reference space;
    adding all the transformed cross correlation functions in order to form a sum cross correlation function of which the abscissas of the useful lobes represent the propagation time of the waves over the reference space.

2. Method as claimed in claim 1, wherein the dimension of the reference space is greater than that of the measuring space.

3. Method as claimed in claim 1, wherein the transformation is a similarity the ratio of which is equal to the ratio of the dimension of the reference space to the dimension of the measuring space.

4. Method as claimed in claim 1, which for each type of wave consists in selecting in each transformed cross-correlation function the closest lobe to the useful lobe of the sum crosscorrelation function, the abscissa of the selected lobe representing the slowness of the type of wave considered in the measuring space.

5. Method as claimed in claim 1, wherein the recordings are obtained using a loggings tool containing at least four transducers of which at least three are placed in a borehole.

6. Method as claimed in claim 1, wherein the measuring space is unidirectional.

7. Method as claimed in claim 5, wherein the logging tool is moved inside the borehole with an advancing step equal to the spacing between two transducers of the same type.

8. Method for the processing of acoustic signals of the type according to which it consists in:
    transmitting acoustic waves by means of transmission;
    receiving the waves after they have propagated in the formations surrounding a borehole on means of reception, the said means of transmission and reception defining between them at least three acoustic paths of different lengths;
    recording during each transmission the totality of the signals received on the means of reception;

marking, at the moment of transmission and for each recording, the respective positions of the means of transmission and reception which gave rise to the said recording;

grouping all the recordings in pairs such that in a given pair the two acoustic paths corresponding to the two recordings of the said pair have one common end and a non common part;

crosscorrelating the two recordings of each pair in order to obtain an elementary crosscorrelation function, characterized in that it consists in:

selecting from the elementary crosscorrelation functions a reference crosscorrelation function which corresponds to a reference layer the thickness of which is greater than the geological layer of interest;

transforming the time variable of each elementary crosscorrelation function other than the reference crosscorrelation function in order to bring each time variable to the dimension of the time variable of the reference crosscorrelation function; and adding all the transformed crosscorrelation functions and the reference crosscorrelation function in order to form a sum crosscorrelation functions of which the abscissas of the useful lobes are representative of the propagation times of the waves in the reference layer.

9. Method as claimed in claim 1, wherein only the parts of the recordings corresponding to a same type of acoustic wave are crosscorrelated.

10. Method as claimed in claim 1, wherein only the parts of the elementary crosscorrelation functions corresponding to a same type of acoustic wave are transformed and added.

11. Method as claimed in claim 8, wherein the reference layer defining a reference space is a whole multiple of the thickness of the layer of interest defining a measuring space.

12. Method as claimed in claim 8, wherein the means of transmission include several equidistant transmitters separated from each other by a distance equal to the thickness of the layer of interest.

13. Method as claimed in claim 8, wherein the means of reception include several equidistant receivers separated from each other by a distance equal to the thickness of the reference layer.

14. Method as claimed in claim 8, wherein the thickness of the layer of interest is equal to 0.25 m.

15. Method as claimed in claim 8, wherein the thickness of the reference layer is equal to one meter.

* * * * *